(12) United States Patent
Vetteth (10) Patent No.: US 8,049,484 B2
(45) Date of Patent: Nov. 1, 2011

(54) CONTROLLING INLINE POWER AT A POWERED DEVICE

(75) Inventor: Anoop Vetteth, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 403 days.

(21) Appl. No.: 12/405,822

(22) Filed: Mar. 17, 2009

(65) Prior Publication Data

US 2010/0237846 A1   Sep. 23, 2010

(51) Int. Cl.
  *G06F 11/00* (2006.01)
  *H04M 1/00* (2006.01)
(52) U.S. Cl. .......... 323/355; 714/43; 379/412; 379/413; 379/900
(58) Field of Classification Search .................. 323/355; 714/43; 379/413, 412, 900
  See application file for complete search history.

(56) References Cited

U.S. PATENT DOCUMENTS

| | | | |
|---|---|---|---|
| 5,994,998 A | 11/1999 | Fisher et al. | |
| 6,115,468 A * | 9/2000 | De Nicolo | 379/413 |
| 6,295,356 B1 * | 9/2001 | De Nicolo | 379/413 |
| 6,473,608 B1 | 10/2002 | Lehr et al. | |
| 6,587,454 B1 | 7/2003 | Lamb | |
| 6,710,704 B2 | 3/2004 | Fisher et al. | |
| 6,975,209 B2 | 12/2005 | Gromov | |
| 7,053,501 B1 | 5/2006 | Barrass | |
| 7,363,525 B2 | 4/2008 | Biederman et al. | |
| 7,373,528 B2 | 5/2008 | Schindler | |
| 7,471,014 B2 | 12/2008 | Lum et al. | |
| 7,474,704 B2 | 1/2009 | Lum et al. | |
| 7,603,570 B2 | 10/2009 | Schindler et al. | |
| 7,793,137 B2 * | 9/2010 | Karam et al. | 714/4.12 |
| 2005/0197094 A1 * | 9/2005 | Darshan et al. | 455/402 |
| 2006/0077888 A1 * | 4/2006 | Karam et al. | 370/216 |
| 2007/0177411 A1 | 8/2007 | Picard | |
| 2009/0172421 A1 | 7/2009 | Schindler | |

\* cited by examiner

*Primary Examiner* — Bao Q Vu
(74) *Attorney, Agent, or Firm* — BainwoodHuang (57) ABSTRACT

A powered device includes a first switch, a second switch, and a controller. The first switch is disposed between a center tap of the first transformer and a center tap of the third transformer. The second switch is disposed between a center tap of the second transformer and a center tap of the fourth transformer. The controller is coupled to the first switch and the second switch. The controller is constructed and arranged to output a control signal to the first and second switches to electrically connect the center taps of the first and third transformers together and concurrently electrically connect the center taps of the second and fourth transformers together. The powered device is constructed and arranged to operate in 4-pair mode when the center taps of the first and third transformers are connected together and the center taps of the second and fourth transformers are connected together.

20 Claims, 6 Drawing Sheets

FIG. 6 ized costs. Examples # CONTROLLING INLINE POWER AT A POWERED DEVICE

BACKGROUND

In a Power over Ethernet (PoE) system, Power Sourcing Equipment (PSE) provides inline power to one or more Powered Devices (PDs) through Ethernet cabling (e.g., CAT-5 cabling). Such inline power delivery eliminates the need for separate AC power wiring and its associated costs. Examples of PDs include Voice over IP (VoIP) telephones, Wireless Local Area Network (WLAN) transmitters, security cameras, and RFID readers.

A traditional 2-pair power transmission approach involves delivery of power through two twisted wire pairs of the Ethernet cabling to a PD. In accordance with IEEE 802.3af, the PD is able to draw a maximum of 12.95 W. In accordance with IEEE 802.3 at, the PD will be able to draw a 25.5 W. Both of these standards involve delivery of power to a PD through two twisted pairs of Ethernet cabling.

A 4-pair power delivery approach (4-pair mode) involves delivery of power to a PD through four twisted pairs of the Ethernet cabling carrying two power signals. That is, one power signal passes through two twisted wire pairs (as part of a first current loop) of the Ethernet cabling and separate power signal passes through two other twisted pairs (as part of a second current loop) of the Ethernet cabling.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Unfortunately, in a 4-pair power delivery approach, it is challenging to efficiently receive two power signals through Ethernet cabling and combine these power signals at the PD in a cost effective manner. Nevertheless, there are some applications that desire more than 30 W at the PD, and thus require the ability to draw power using the two individual wire pairs (i.e., all four wire pairs) of the Ethernet cabling. Such applications include videophones, remote camera actuators, multichannel access points, and notebook computers, among others.

Advantageously, an improved technique involves electrically connecting the center taps of PD transformers to combine one power signal transmitted through two twisted wire pairs (a first 2-pair) and a second power signal transmitted through two other twisted pairs (a second 2-pair). Such an improved technique provides a simple and cost effective mechanism for providing 4-pair power (over individual 2-pairs) to the PD. Moreover, such a technique can be effectuated in a manner that enables the PD to remain compliant to the IEEE 802.3 standards.

It should understood that such a technique is further capable of reducing cable loss. In particular, since the improved technique essentially halves the current through each 2-pair, the net power loss from the Ethernet cabling is also halved, i.e., $$P = I^2 R \qquad \text{(Equation 1)}$$

where
P=power loss through the Ethernet cabling;
I=current through the Ethernet cabling; and
R=the Ethernet cabling resistance.

In one embodiment, an inline powered device includes first switch circuitry, second switch circuitry, and control circuitry. The first switch circuitry (e.g., a first aggregation relay or solid state switch) is disposed between a center tap of a first transformer and a center tap of a third transformer. The second switch circuitry (e.g., a second aggregation relay or solid state switch) is disposed between a center tap of a second transformer and a center tap of a fourth transformer. The control circuitry is coupled to the first switch circuitry and the second switch circuitry. The control circuitry is constructed and arranged to output a control signal to the first and second switch circuitry to electrically connect the center taps of the first and third transformers together, and concurrently electrically connect the center taps of the second and fourth transformers together. The inline powered device is constructed and arranged to operate in 4-pair mode when (i) the center taps of the first and third transformers are connected together and (ii) the center taps of the second and fourth transformers are connected together.

DESCRIPTION OF EXAMPLE EMBODIMENTS

Figure 1:
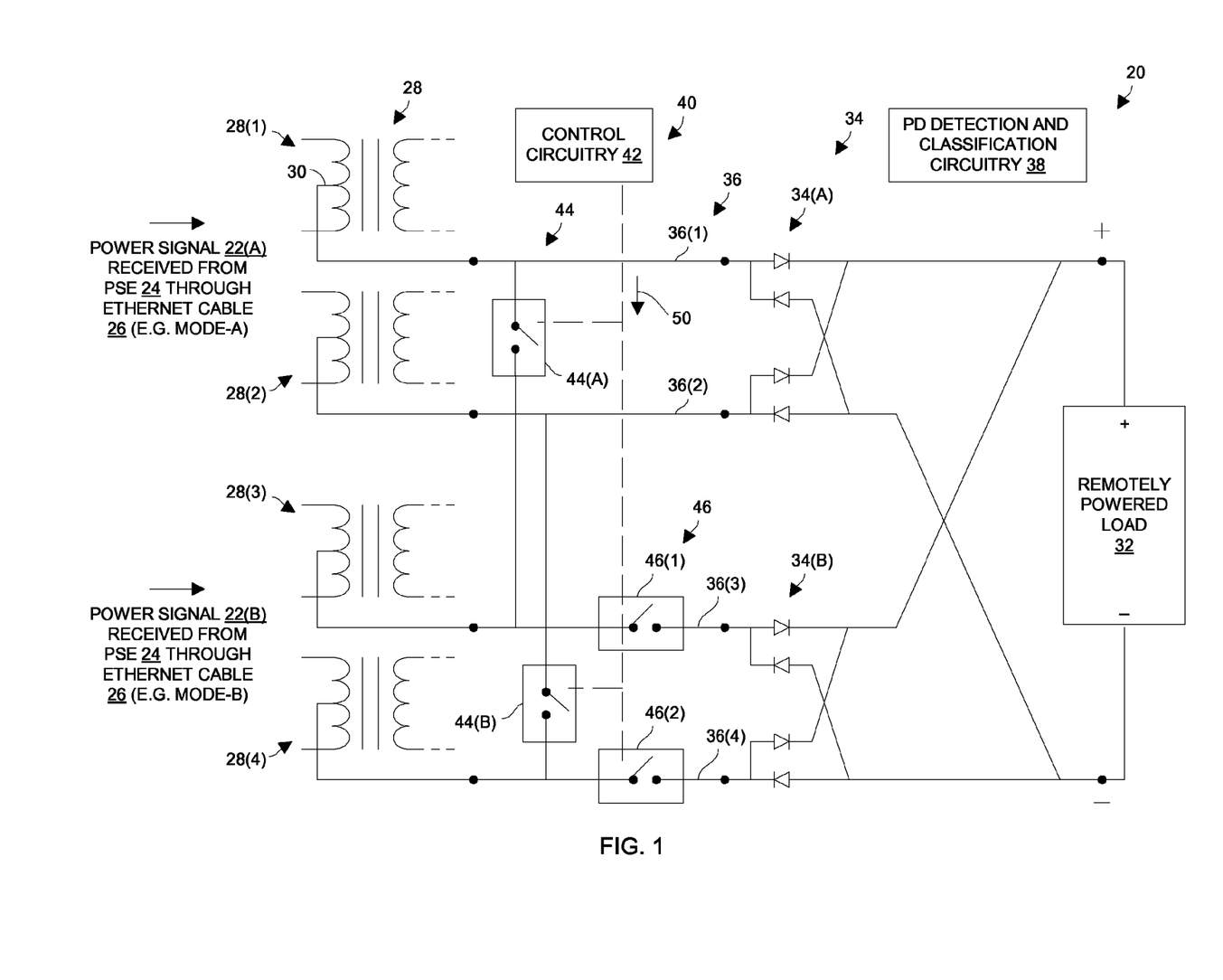
FIG. 1 is a block diagram of a powered device circuit which is constructed and arranged to connect transformer center taps using switching circuitry to combine power signals.

FIG. 1 shows a powered device circuit 20 which is suitable for use as at least a portion of a powered device (PD) of a Power over Ethernet (PoE) system. The PD circuit 20 is constructed and arranged to connect its transformer center taps using switching circuitry to combine separate power signals 22(A), 22(B) received from Power Sourcing Equipment (PSE) 24 through a common Ethernet cable 26. Accordingly, power transmitted from the PSE 24 over individual 2-pairs (i.e., 4-pair power) is easily and effectively combined at the PD circuit 20.

The powered device circuit 20 includes four transformers 28(1), 28(2), 28(3), and 28(4) (collectively, transformers 28). Each transformer 28 includes a center tap 30 (e.g., see the transformer 28(1)) on the cable winding side. As a result, each transformer 28 effectively enables data to cross its isolation boundary for exchange with the PD communications circuitry, and the center tap 30 of that transformer 28 provides a path for current flow in order to power to the PD.

The powered device circuit 20 further includes a load 32, diode bridges 34, electrical pathways 36, and PD detection/classification circuitry 38. The load 32 is capable of taking a variety of electronic circuit forms which benefit from receiving inline power from, as well as communicating with, the PSE 24 through the Ethernet cable 26. Examples of such electronic circuits include videophone circuitry, multi-channel access point circuitry, WLAN transmitter circuitry, robotic security camera circuitry, thin client circuitry, remote computerized devices, and so on.

The diode bridges 34 include a diode bridge 34(A) associated with the power signal 22(A), and a diode bridge 34(B) associated with the power signal 22(B). In particular, the diode bridge 34(A) couples to the center tap 30 of the transformer 28(1) through the electrical pathway 36(1), and further couples to the center tap 30 of the transformer 28(2) through the electrical pathway 36(2). Similarly, the diode bridge 34(B) couples to the center tap 30 of the transformer 28(3) through the electrical pathway 36(3), and further couples to the center tap 30 of the transformer 28(4) through the electrical pathway 36(4). During operation, the diode bridges 34 provide rectification and backfeed voltage protection.

The PD detection and classification circuitry 38 participates in detection and classification. Detection and classification are done in accordance with IEEE 802.3af and IEEE 802.3 at.

As shown in FIG. 1, the powered device circuit 20 further includes a controller 40 having control circuitry 42 and switches (or relays) 44(A), 44(B) (collectively, switches 44). The switch 44(A) is disposed between the center taps 30 of the transformers 28(1), 28(3), i.e., one terminal couples to the electrical pathway 36(1) leading to the center tap 30 of the transformer 28(1) and the other terminal couples to the electrical pathway 36(3) leading to the center tap 30 of the transformer 28(3). Similarly, the switch 44(B) is disposed between the center taps 30 of the transformers 28(2), 28(4), i.e., one terminal couples to the electrical pathway 36(2) leading to the center tap 30 of the transformer 28(2) and the other terminal couples to the electrical pathway 36(4) leading to the center tap 30 of the transformer 28(4).

In some arrangements, the switches 44(A), 44(B) are mechanical relays having their control terminals operated by the control circuitry 42 (see the dashed lines in FIG. 1). In these arrangements, the switches 44(A), 44(B) are constructed and arranged to open and close in response to a control signal 50 outputted by the control circuitry 42.

In other arrangements, the switches 44(A), 44(B) are solid state (or semiconductor-based) and are electronically controlled by the control circuitry 42, i.e., the current pathways open and close in response to the control signal 50 from the control circuitry 42. Other switching mechanisms are suitable for use as well.

Additionally, as shown in FIG. 1, the controller 42 further includes other switches (or relays) 46(1), 46(2). These other switches 46(1), 46(2) (collectively, switches 46) are constructed and arranged to open and close in response to the control signal 50 (e.g., see the dashed line in FIG. 1) outputted by the control circuitry 42. In the presence of 4-pair power, opening switches 46(1), 46(2) prevents the undesired effects of having two diodes carry current in parallel (also see the diode bridges 34). In situations in which this prevention is unnecessary, the switches 46(1), 46(2) can be eliminated.

It should be understood that the center taps 30 of the transformers 28(1) and 28(3) are associated with the same polarity (positive or negative). Similarly, the center taps 30 of the transformers 28(2) and 28(4) are associated with the same polarity, but opposite the polarity of transformers 28(1) and 28(3).

During operation, the controller 40 controls opening and closing of the switches 44 and 46 depending on whether the PSE 24 delivers 2-pair power or 4-pair power to the PD circuit 20 through the Ethernet cable 26. In particular, when the PSE 24 delivers 2-pair power, the control circuitry 42 leaves the switches 44(A), 44(B) in their open state and further leaves the switches 46(1), 46(2) in their closed state (i.e., the default positions of the switches 44, 46). During such operation, the PD circuit 20 receives only one power signal (e.g., the power signal 22(A) or mode-A power) from the PSE 24. Nevertheless, the PD circuit 20 is able to exchange information (i.e., transmit and receive data) with the PSE 24 through the transformers 28(1), 28(2), or through all four transformers 28, and is IEEE 802.3 compliant. Such operation may be advantageous in a variety of situations such as if the PSE 24 is IEEE compliant equipment which is able to deliver only 2-pair power (e.g., 30 Watts or less).

For 4-pair power delivery by the PSE 24, the control circuitry 42 outputs the control signal 50 to transition the switches 44(A), 44(B) to their closed state and to transition the switches 46(1), 46(2) in their open state. In this situation, the PD circuit 20 receives both power signals 22(A), 22(B) from the PSE 24 (mode-A power and mode-B power). Furthermore, the PD circuit 20 is able to exchange information (i.e., transmit and receive data) with the PSE 24 through the transformers 28(1), 28(2), or through all four transformers 28. In this situation, the center taps 30 of the transformers 28(1), 28(3) are connected together and the center taps 30 of the transformers 28(2), 28(4) are connected together, and the PD circuit 20 is able to draw higher power (e.g., more than 25 Watts).

In arrangements where switches 46 are present, it was mentioned above that the default state for the switches 44 is OFF (i.e., open), and the default state for the switches 46 is ON (i.e., closed). The state for the switch 44(1) is always opposite the state for the switch 46(1), i.e., switches 44(1), 46(1) are not simultaneously ON or OFF. Similarly, the state for the switch 44(2) is always opposite the state for the switch 46(2), i.e., switches 44(1), 46(1) are not simultaneously ON or OFF.

In arrangements which do not include switches 46 (i.e., the center taps 30 of transformers 28(3), 28(4) directly connect to the diode bridge 34(B) through the electrical pathways 36(3), 36(4)), the PD circuit 20 works seamlessly regardless of whether the PSE 24 is default Alt-A or default Alt-B. When 4-pair power is enabled, the corresponding diodes in each diode bridge 34(A), 34(B) remain in parallel. As a result, any discrepancy in terms of routing and junction temperatures may lead to uneven current split between the two corresponding diodes. Nevertheless, this is not a concern if all diodes in both diode pairs are capable of handling the full current of the PD circuit 20.

It should be understood that the PSE 24 may initially provide 2-pair power (e.g., the power signal 22(A)), and require the PD circuit 20 to communicate it's 4-pair power capability before providing 4-pair power. Such would be the case if, after providing 2-pair power for some time, the PSE 24 subsequently determined that it is appropriate to turn on both mode-A power and mode-B power to the PD circuit 20. The PSE 24 understands the 4-pair capability of the PD circuit 20 by either performing physical layer detection/classification or by data link layer negotiation. With 4-pair capability now known to the PSE 24, the PD circuit 20 effectively controls connection and disconnection of the transformer center taps 30 as will now be discussed in further detail with reference to FIGS. 2 and 3.

Figure 2:
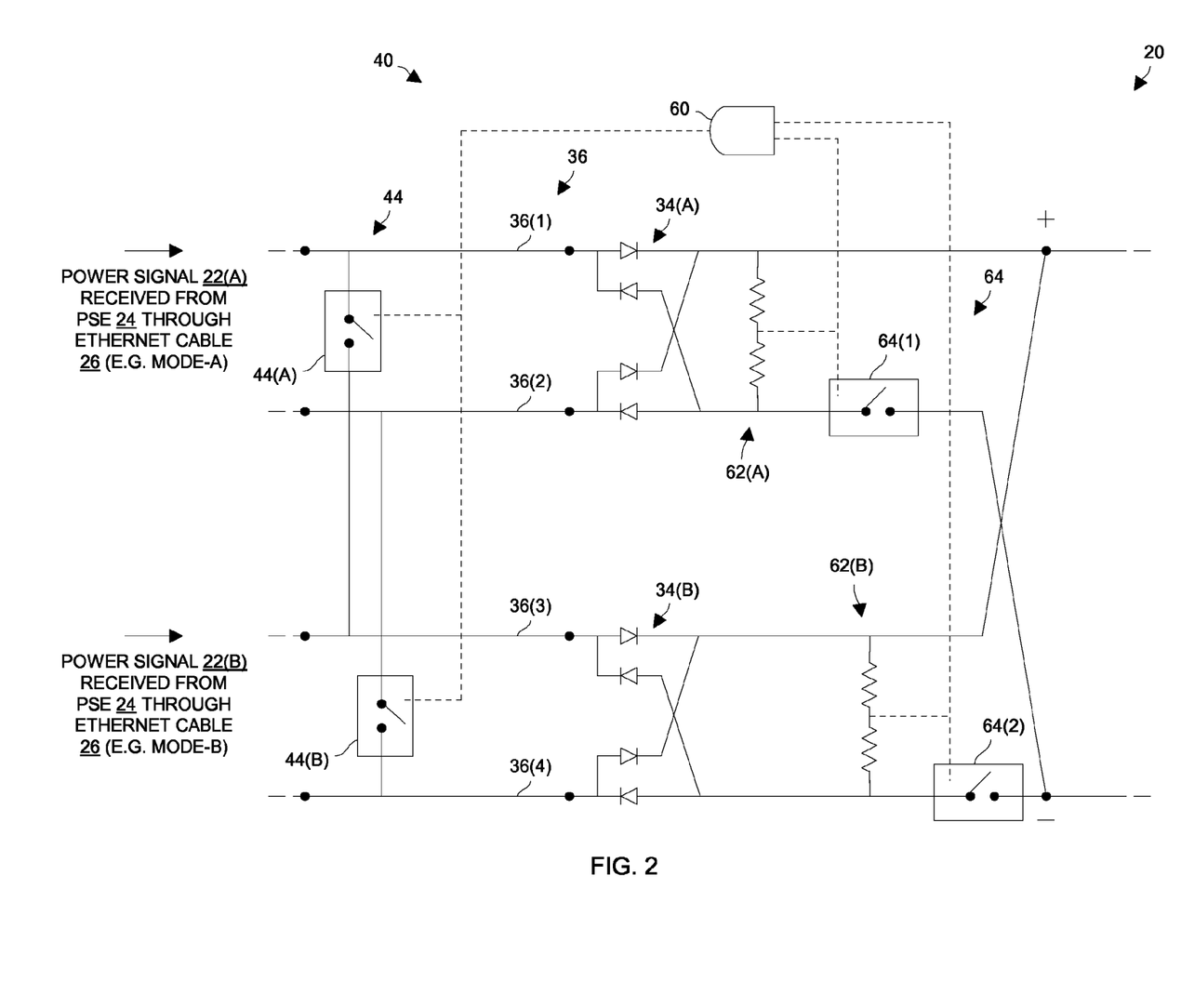
FIG. 2 is a diagram which details a first technique for controlling the switching circuitry of FIG. 1.

FIG. 2 shows a physical layer implementation which controls opening and closing the switches 44(A), 44(B) based on whether the PSE 24 is providing 2-pair power or 4-pair power. That is, the PD circuitry of FIG. 2 combines power from individual 2-pair after the PSE 24 provides both power signals 22(A), 22(B) through the Ethernet cable 26 (also see FIG. 1). Although the transformers 28, the switches 46, and the load 32 are present in the PD circuit 20, they are omitted from FIG. 2 for simplification purposes.

As shown, the controller 40 includes AND gate logic 60, voltage dividers 62(A), 62(B) (i.e., scaled voltage sensing circuitry), and switches 64(1), 64(2) (collectively, switches 64). The middle of the voltage divider 62(A) connects to one of the inputs of the AND gate logic 60 and to the control input of the switch 64(1). Similarly, the middle of the voltage divider 62(B) connects to the other input of the AND gate logic 60 and to the control input of the switch 64(2). The output of the AND gate logic 60 connects to the control terminals of the switches 44(A), 44(B).

During operation, the AND gate logic 60 controls the switches 44(A), 44(B) (also see the control signal 50 in FIG. 1). In particular, if the power signal 22(A) is present, the corresponding input of the AND gate logic 60 sees a scaled voltage at the voltage divider 62(A). Likewise, if the power signal 22(B) is present, the corresponding input of the AND gate logic 60 sees a scaled voltage at the voltage divider 62(B). Accordingly, when both power signals 22(A), 22(B) are present, the AND gate logic 60 closes the switches 44(A), 44(B).

It should be understood that the switches 64 ensure that the circuitry used to sense if a particular 2-pair is ON does not interfere with similar circuitry on the other 2-pair. In some arrangements, each switch 64 is implemented as a MOSFET.

It should be further understood that, when less than both power signals 22(A), 22(B) are present, the AND gate logic 60 leaves the switches 44(A), 44(B) in their open default states. As a result, the PD circuit 20 remains IEEE 802.3 compliant, and is thus compatible with legacy power sourcing equipment. Further details will now be provided with reference to FIG. 3.

Figure 3:
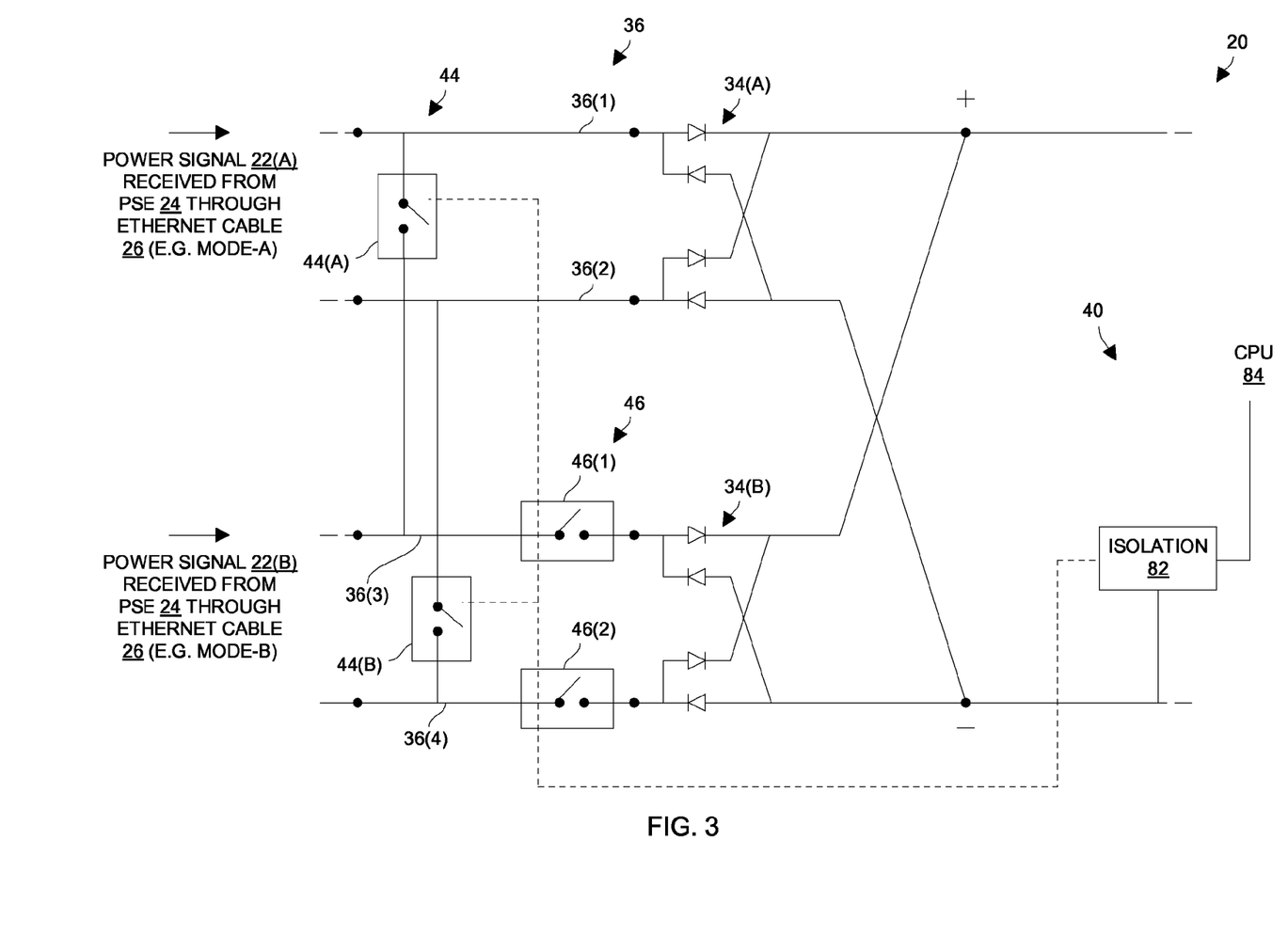
FIG. 3 is a diagram which details a second technique for controlling the switching circuitry of FIG. 1.

FIG. 3 shows an alternative implementation which controls opening and closing the switches 44(A), 44(B) before 4-pair power is turned on. Here, the PD closes switches 44(A), 44(B) before the PSE 24 provides both power signals 22(A), 22(B) through the Ethernet cable 26 (also see FIG. 1). In this implementation, the PD circuit 20 probes the capabilities of the PSE 24 while operating under 2-pair power, and is able to aggregate the power signals 22(A), 22(B) prior to the PSE 24 turning on 4-pair power. This mechanism works seamlessly when the PSE 24 is by default Mode-A. Again, although the transformers 28, the switches 46, and the load 32 are present in the PD circuit 20, they are omitted from FIG. 2 for simplification purposes.

The controller 40 includes isolation barrier circuitry 82 which works in cooperation with a CPU 84. The isolation barrier circuitry 82 connects to the control inputs of each of the switches 44, 46. In some arrangements, the controller 40 includes the CPU 84 (e.g., a processor of the load 32 is leveraged to form part of the controller 40).

During operation, the CPU 84 operates as a sophisticated sensor by probing the capabilities of the PSE 24 via the data link layer network discovery protocol. Since the CPU 84 is isolated from direct control over the switches 44, 46, the CPU 84 directs the isolation barrier circuitry 82, which crosses the isolation barrier, to open/close the switches 44, 46. In particular, when the CPU 84 determines that the PSE 24 is 4-pair power capable, the CPU 84 signals the isolation barrier circuitry 82 to close switches 44, and open switches 46. As a result, the PD circuit 20 is able to enjoy 4-pair power operation once the PSE 24 provides power through both mode-A and mode-B.

However, when the CPU 84 determines that the PSE 24 is only 2-pair power capable, the CPU 84 signals the isolation barrier circuitry 82 to maintain the switches 44 in their default open states, and the switches 46 in their default closed states. In this situation, the PD circuit 20 is able to continue enjoying 2-pair power operation (e.g., the PD circuit 20 only receives the power signal 22(A)) and the load is able to communicate with the PSE 24 through the Ethernet cable 26. As mentioned earlier, the switches 46 are optional. Further details will now be provided with reference to FIG. 4.

Figure 4:
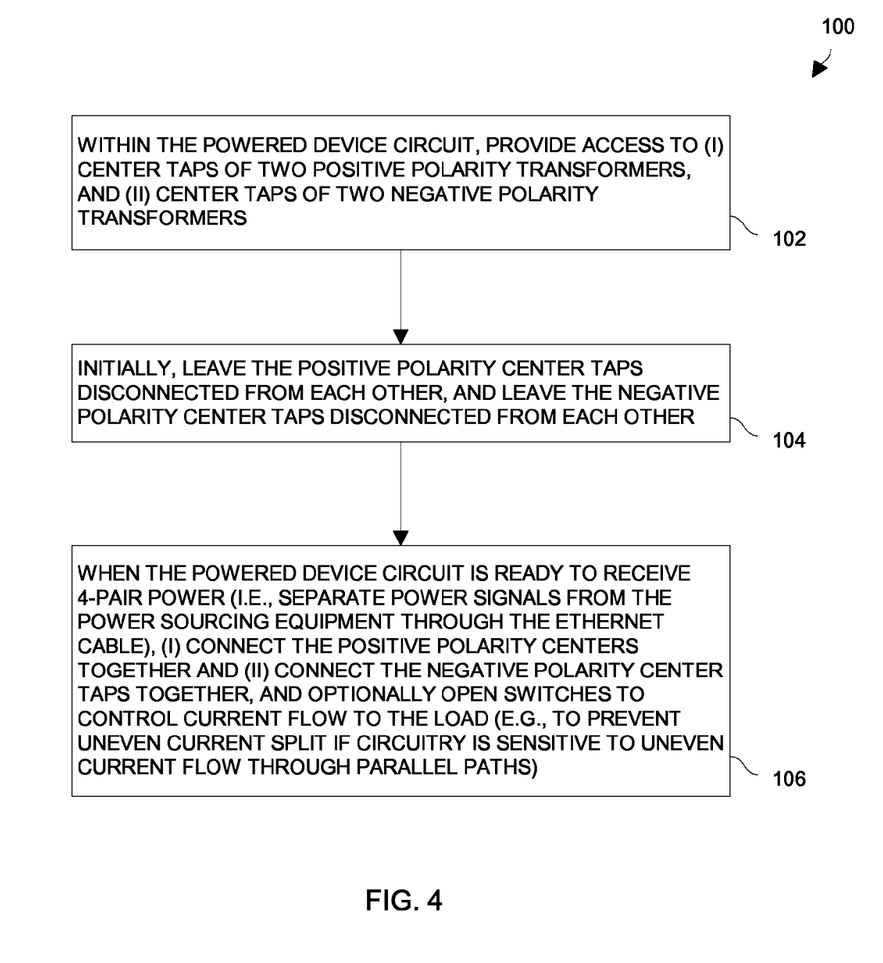
FIG. 4 is a flowchart of a procedure for controlling the switching circuitry of FIG. 1.

FIG. 4 is a flowchart of a procedure 100 which is performed by the PD circuit 20 for reliable and effective power aggregation (FIGS. 1 through 3 may also be referenced). In step 102, access to the center taps 30 of the transformers 28 is provided. Recall in the description above, in connection with FIG. 1, that the center taps 30 of the transformers 28(1) and 28(3) have the same polarity. Similarly, the center taps 30 of the transformers 28(2) and 28(4) have the same polarity, but reverse polarity from the center taps 30 of transformers 28(1) and 28(3).

In step 104, the control circuitry 42 of the PD circuit 20 initially opens the switches 44(A), 44(B). As a result, the center taps 30 of the positive polarity transformers 28(1), 28(3) are initially disconnected from each other. Likewise, the center taps 30 of the negative polarity transformers 28(2), 28(4) are initially disconnected from each other. In this situation, the PD circuit 20 is capable of receiving 2-pair power in compliance with IEEE 802.3.

In step 106, the control circuitry 42 of the PD circuit 20 closes the switches 44(A), 44(B). As a result, the center taps 30 of the positive polarity transformers 28(1), 28(3) are now shorted together, and the center taps 30 of the negative polarity transformers 28(2), 28(4) are now shorted together. Recall that, in some arrangements, the control circuitry 42 is constructed and arranged to close the switches 44(A), 44(B) after 4-pair power is turned ON (e.g., also see FIG. 2). In other arrangements, the control circuitry 42 is constructed and arranged to close the switches 44(A), 44(B) before 4-pair power is turned ON such as in response to carrying out a network discovery protocol (e.g., also see FIG. 3).

Optionally, the control circuitry 42 opens other switches for current control purposes. For example, certain current pathways of the PD circuit 20 may be sensitive to uneven current flow, and these other switches facilitate control over such current flow. In FIGS. 1, 2, and 3, these switches are shown as switches 46(A), 46(B). Further details will now be provided with reference to FIG. 5.

Network Discovery Involving Different Classification Signatures

FIGS. 2 and 3 were described above as relying on data link layer based network discovery. Other network discovery techniques are suitable for use as well such as physical layer based network discovery.

Figure 5:
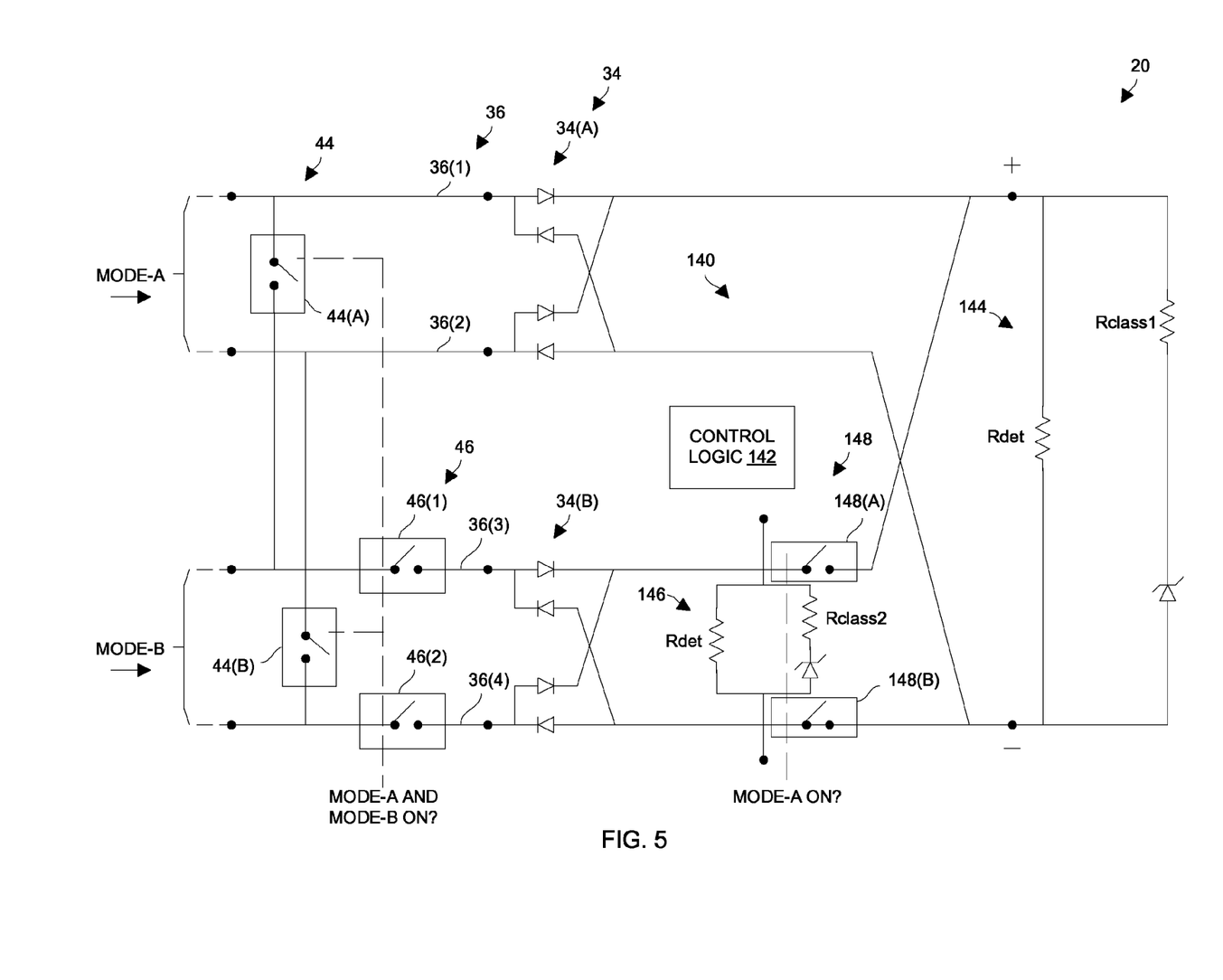
FIG. 5 is a diagram of physical-layer circuitry of the powered device circuit which is suitable for participating in network discovery with power sourcing equipment.

FIG. 5 shows a physical-layer circuit 140 which is suitable for participating in network discovery (i.e., detection and classification) with the PSE 24 (also see FIG. 1). The physical-layer circuit 140 is well-suited for applications in which heavier-weight processing (e.g., a CPU) is not readily available (e.g., the PSE 24 has not yet turned on power for CPU operation, the PD circuit 20 does not have a CPU, etc.). It should be understood that the transformers 28 and the load 32 are present in the PD circuit 20, but omitted from FIG. 5 for simplification purposes.

As shown in FIG. 5, the physical-layer circuit 140 includes control logic 142, first detection/classification circuitry 144, second detection/classification circuitry 146, and a set of switches 148(A), 148(B) (collectively, switches 148). The control logic 142 connects to the control inputs of each of the switches 44, 46, and 148 as illustrated logically by the dashed lines in FIG. 5. The first detection/classification circuitry 144 includes resistors (e.g., Rclass1 and Rdet in parallel) to provide a first classification signature ("Rclass1") as part of a network discovery process carried out by the PSE 24 through the Ethernet cable 26 (also see FIG. 1). Furthermore, the second detection/classification circuitry 146 includes resistors (e.g., Rclass2 and Rdet in parallel) to provide a second classification signature ("Rclass2") as part of the network discovery process.

During operation, the control logic 142 is constructed and arranged to open and close the switches 44, 46, and to direct where the switch 148 connects at various times. In particular, when mode-A and mode-B power is off (i.e., by default), the control logic 142 actuates the switches 148 to connect mode-B (i.e., the transformers 28(3), 28(4) in FIG. 1) to the first detection/classification circuitry 144. However, when mode-A power is on, the control logic 142 changes the switches 148 to connect mode-B to the second detection/classification circuitry 146.

With the above-described operation in mind, when power is initially off on mode-A and mode-B (e.g., prior to network discovery by the PSE 24), the control logic 142 closes the switches 46 and opens the switches 44, and operates switches 148 to connect electrical pathways 36(3), 36(4) to the first detection/classification circuitry 144. As a result, when the PSE 24 performs detection and classification through the Ethernet cable 26 over mode-A (also see FIG. 1), the PSE 24 receives a valid detection and signature (e.g., the detection/classification signature "Rclass1"). Similarly, when the PSE 24 performs detection and classification over mode-B, the PSE 24 receives the same valid detection and signature (e.g., "Rclass1").

Furthermore, when power is subsequently turned on over mode-A, the PSE 24 may nevertheless perform detection and classification through the Ethernet cable 26 over mode-B. Since mode-A power is now turned on, the control logic 142 adjusts the switches 148 so that mode-B now connects the electrical pathways 36(3), 36(4) to the second detection/classification circuitry 146. Accordingly, when the PSE 24 performs detection and classification over mode-B with mode-A power turned on, the PSE 24 receives the second valid detection and signature (e.g., "Rclass2") which is different than the first valid detection and signature (i.e., "Rclass2" is different than "Rclass1").

When the PSE 24 sees this difference in classification signature (i.e., sensing "Rclass1" when mode-A and mode-B power are off, but sensing "Rclass2" when mode-A is on and mode-B power is off), the PSE 24 determines that it can turn on both mode-A power and mode-B power (i.e., the PSE 24 can deliver 4-pair power to the PD circuit 20). With mode-A and mode-B power available, the control logic 142 can then close switches 44 and open switches 46. As a result, the second diode bridge 34(B) is disconnected and mode-A and mode-B are shorted together for effective power aggregation.

It should be understood that, if the PSE 24 were to carry out similar detection and classification on a legacy IEEE compliant PD, the PSE 24 would not sense the same behavior. Rather, the PSE 24 would sense valid detection and the same classification signature (e.g., "Rclass1") over mode-A and mode-B with mode-A and mode-B power turned off. However, after turning on power over mode-A, the PSE 24 would sense invalid detection over mode-B and hence would not proceed to perform classification. Accordingly, the PSE 24 would determine that it should not turn on power over mode-B. Further details will now be provided with reference to FIG. 6.

Protection Circuitry

In non-standard cabling environments, there may not be certainty that the center taps 30 of the transformers 28(1) and 28(3) will have the same polarity, and that the center taps 30 of the transformers 28(2) and 28(4) will have the same polarity but reverse polarity from the center taps 30 of transformers 28(1) and 28(3). In these environments, the protection circuitry of the PD may take the form of the PHY's capabilities. That is, the PHY's cable diagnostics may determine whether each individual 2-pair in the Ethernet cable 26 is crossed over or leads straight through.

Figure 6:
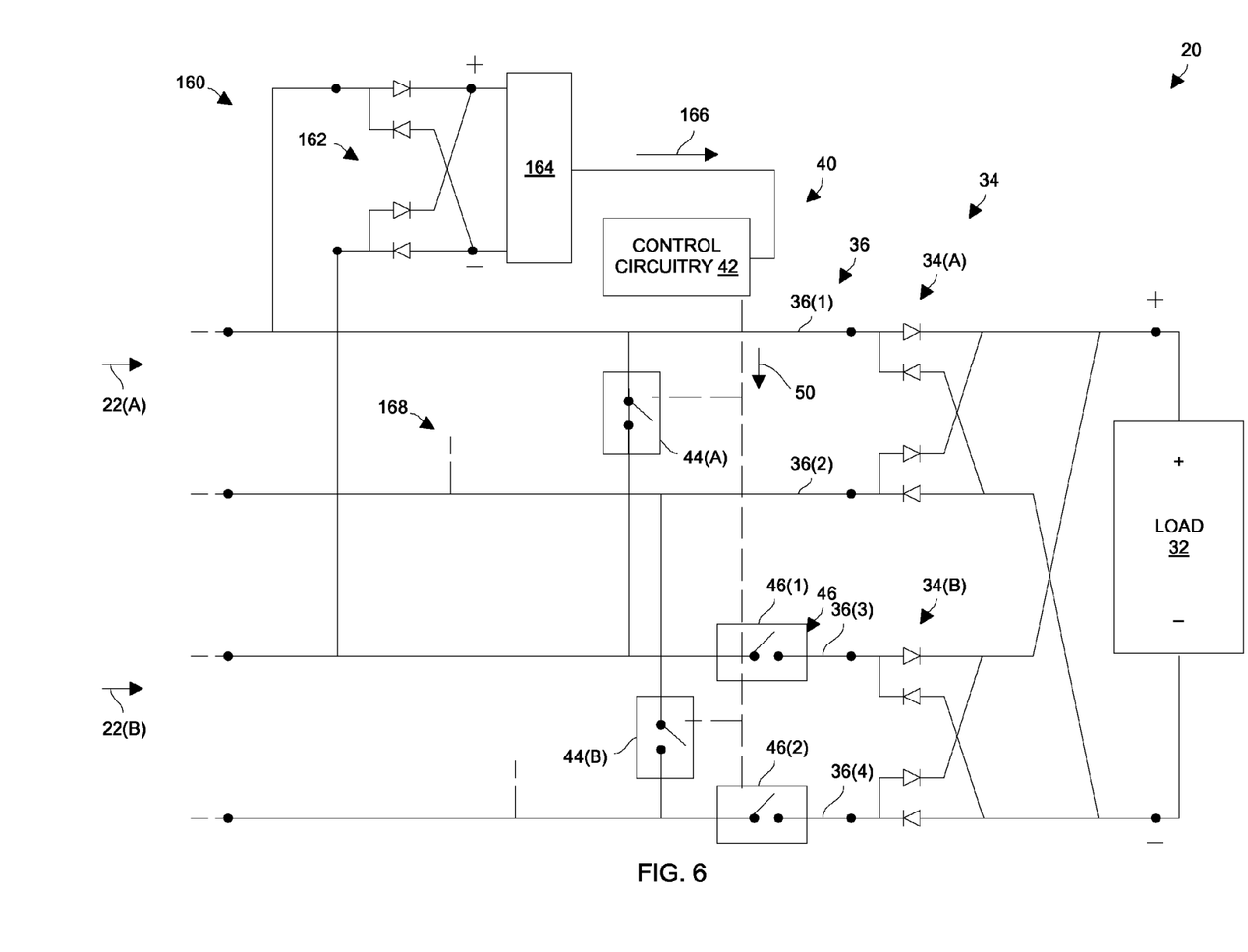
FIG. 6 is a diagram of a protection circuit which is suitable for use with the switching circuitry of FIG. 1.

However, if the PHY does not support this, FIG. 6 illustrates a suitable protection circuit 160 which is capable of being employed by the PD as an alternative. As shown in FIG. 6, the protection circuit 160 includes a diode bridge 162 and a threshold detector 164 (e.g., compare circuitry). The diode bridge 162 connects to the electrical pathway 36(1) leading to the center tap 30 of the transformer 28(1), and further connects to the electrical pathway 36(3) leading to the center tap 30 of the other transformer 28(3) (also see FIG. 1). The threshold detector 164 has inputs connected to the remaining legs of the diode bridge 162, and an output connected to the control circuitry 42.

During operation, the protection circuit 160 checks the center taps 30 of the transformers 28(1), 28(3) to determine whether it is safe to keep the switches 44(A), 44(B) open. The protection circuit 160 closes the switches 44(A) and 44(B) only after power is received by both 2-pairs. The protection circuit 160 opens the switches 46(A) and 46(B) after the PD understands that the PSE 24 is 4-pair capable by performing data link layer based negotiation. Then the PD waits for the PSE 24 to enable power on Mode-B, and the threshold detector 164 and the control circuitry 42 decide together whether to close the switches 44(A) and 44(B). The threshold detector 164 expects the voltage to be below a predefined value. In particular, there is little if any the diode bridge voltage, as measured between the (+) and (−) terminals, when there is 4-pair power. However, if there is only 2-pair power, the diode bridge voltage, as measured between the (+) and (−) terminals, is significant (i.e., above a predefined amount).

With respect to the threshold detector 164, the threshold detector 164 outputs a detection signal 166 with an asserted level when there is 4-pair power, i.e., when the voltage across the (+) and (−) terminals is below a predetermined threshold. However, the threshold detector 144 outputs the protection signal 166 with a de-asserted level when there is only 2-pair power or when polarity of the center taps 30 of transformers 28(1) and 28(3) is not the same, i.e., when the voltage across the (+) and (−) terminals is equal or above the predetermined threshold. A suitable predetermined threshold is a voltage between 0 and 48 volts and is capable of depending on the level of risk/susceptibility of the various circuitry (e.g., 5 volts, 12 volts, 24 volts, 40 volts, etc.).

In some arrangements, the same circuitry 160 is duplicated for the electrical pathways 36(2), 36(4) leading to the center taps 30 of the negative polarity transformers 28(2), 28(4) (also see FIG. 1). For simplicity, this duplicate circuitry is illustrated in FIG. 6 by the arrow 168 which generally points to the dashed lines extending from the electrical pathways 36(2), 36(4). The output of such circuitry 168 connects to the control circuitry 42 to enable and disable its operation in a manner similar to that of the circuitry 140.

Furthermore, in some arrangements, the control circuitry 42 uses the protection signal 166 in combination with Layer-2 information to make a decision on whether to turn the switches 44 ON or OFF. In these arrangements, the control circuitry 42 is capable of "smarter" decision making with respect to the switches 44.

CONCLUSION

As described above, an improved technique involves electrically connecting the center taps 30 of transformers 28 of a PD circuit 20 to combine one power signal 22(A) transmitted through two twisted wire pairs and a second power signal 22(B) transmitted through two other twisted pairs of an Ethernet cable 26. Such an improved technique provides a simple and cost effective mechanism to aggregate individual 2-pair power to provide 4-pair power to the PD circuit 20. Moreover, such a technique can be effectuated in a manner that enables the PD circuit 20 to remain compliant to the IEEE 802.3 standards.

While various embodiments of the invention have been particularly shown and described, it will be understood by those skilled in the art that various changes in form and details may be made therein without departing from the spirit and scope of the invention as defined by the appended claims.

What is claimed is:

1. An inline powered device, comprising:
   a set of transformers, each transformer of the set of transformers (i) having a center tap for inline power delivery and (ii) being constructed for data exchange with power sourcing equipment;
   a load coupled to the set of transformers, the load being constructed and arranged to (i) obtain power from the power sourcing equipment through the set of transformers, and (ii) conduct communications data exchange with the power sourcing equipment through the set of transformers; and
   a controller coupled to the set of transformers, the controller including:
      first switch circuitry disposed between a center tap of the first transformer and a center tap of the third transformer,
      second switch circuitry disposed between a center tap of the second transformer and a center tap of the fourth transformer, and
      control circuitry coupled to the first switch circuitry and the second switch circuitry, the control circuitry being constructed and arranged to output a control signal to the first and second switch circuitry to electrically connect the center taps of the first and third transformers together and concurrently electrically connect the center taps of the second and fourth transformers together, the inline powered device being constructed and arranged to operate in 4-pair mode when (i) the center taps of the first and third transformers are connected together and (ii) the center taps of the second and fourth transformers are connected together.

2. An inline powered device as in claim 1 wherein the first switch circuitry of the controller includes a first aggregation relay disposed between the center taps of the first and third transformers;
   wherein the second switch circuitry of the controller includes a second aggregation relay disposed between the center taps of the second and fourth transformers;
   wherein the control circuitry of the controller, when outputting the control signal, is constructed and arranged to (i) close the first aggregation relay to connect the center taps of the first and third transformers together and (ii) close the second aggregation relay to connect the center taps of the second and fourth transformers together.

3. A controller for an inline powered device having a first transformer, a second transformer, a third transformer, and a fourth transformer, the controller comprising:
   first switch circuitry disposed between a center tap of the first transformer and a center tap of the third transformer;
   second switch circuitry disposed between a center tap of the second transformer and a center tap of the fourth transformer; and
   control circuitry coupled to the first switch circuitry and the second switch circuitry, the control circuitry being constructed and arranged to output a control signal to the first and second switch circuitry to electrically connect the center taps of the first and third transformers together and concurrently electrically connect the center taps of the second and fourth transformers together, the inline powered device being constructed and arranged to operate in 4-pair mode when (i) the center taps of the first and third transformers are connected together and (ii) the center taps of the second and fourth transformers are connected together.

4. A controller as in claim 3 wherein the first switch circuitry includes a first aggregation relay disposed between the center taps of the first and third transformers;
   wherein the second switch circuitry includes a second aggregation relay disposed between the center taps of the second and fourth transformers;
   wherein the control circuitry, when outputting the control signal, is constructed and arranged to (i) close the first aggregation relay to connect the center taps of the first and third transformers together and (ii) close the second aggregation relay to connect the center taps of the second and fourth transformers together.

5. A controller as in claim 4 wherein a first electrical pathway connects the center tap of the first transformer to a first diode bridge;
   wherein a second electrical pathway connects the center tap of the second transformer to the first diode bridge;
   wherein a third electrical pathway connects the center tap of the third transformer to a second diode bridge;
   wherein a fourth electrical pathway connects the center tap of the fourth transformer to the second diode bridge;
   wherein closing the first aggregation relay includes shorting the first and third electrical pathways together; and
   wherein closing the second aggregation relay includes shorting the second and fourth electrical pathways together.

6. A controller as in claim 5, further comprising:
   a first inline relay constructed and arranged to electrically disconnect the second diode bridge from the center tap of the third transformer; and
   a second inline relay constructed and arranged to electrically disconnect the second diode bridge from the center tap of the fourth transformer.

7. A controller as in claim 5, further comprising:
   a sensor circuit constructed and arranged to sense through a third diode bridge connected across the first and third electrical pathways to (i) determine whether a predefined voltage difference exists between the first and third electrical pathways, the third diode bridge being separate and distinct from the first and second diode bridges, and (ii) disable the control circuitry when the predefined voltage difference exists between the first and third electrical pathways.

8. A controller as in claim 4 wherein the control signal outputted by the control circuitry is constructed and arranged to mechanically actuate the first aggregation relay, and concurrently mechanically actuate the second aggregation relay.

9. A controller as in claim 8 wherein the control circuitry is constructed and arranged to output the control signal to the first aggregation relay and the second aggregation relay only after power sourcing equipment provides inline power through the center taps of the first and second transformers and concurrently through the center taps of the third and fourth transformers.

10. A controller as in claim 8 wherein the control circuitry is constructed and arranged output the control signal to the first aggregation relay and the second aggregation relay before power sourcing equipment provides inline power through the center taps of the first and second transformers and concurrently through the center taps of the third and fourth transformers.

11. A controller as in claim 4 wherein the control circuitry, when power sourcing equipment has power turned off to the center taps of the first and third transformers and to the center taps of the second and fourth transformers, present (i) a first classification signature to the power sourcing equipment through the center taps of the first and second transformers, and (ii) the first classification signature to the power sourcing equipment through the center taps of the third and fourth transformers; and
   wherein the control circuitry, when the power sourcing equipment subsequently has power turned on to the center taps of the first and second transformers, present a second classification signature to the power sourcing equipment through the center taps of the third and fourth transformers, the second classification signature being different than the first classification signature.

12. A method of operating an inline powered device, the method comprising:
   providing access to (i) a center tap of a first transformer, (ii) a center tap of a second transformer, (iii) a center tap of a third transformer, and (iv) a center tap of a fourth transformer, the center taps of the first and third transformers initially being electrically disconnected from each other, and the center taps of the second and fourth transformers initially being electrically disconnected from each other;
   electrically connecting the center taps of the first and third transformers together; and
   electrically connecting the center taps of the second and fourth transformers together, the inline powered device being constructed and arranged to operate in 4-pair mode when (i) the center taps of the first and third transformers are connected together and (ii) the center taps of the second and fourth transformers are connected together.

13. A method as in claim 12 wherein the inline powered device includes (i) a first aggregation relay disposed between the center taps of the first and third transformers, and (ii) a second aggregation relay disposed between the second and fourth transformers;
   wherein electrically connecting the center taps of the first and third transformers together includes closing the first aggregation relay; and
   wherein electrically connecting the center taps of the second and fourth transformers together includes closing the second aggregation relay.

14. A method as in claim 13 wherein a first electrical pathway connects the center tap of the first transformer to a first diode bridge;
   wherein a second electrical pathway connects the center tap of the second transformer to the first diode bridge;
   wherein a third electrical pathway connects the center tap of the third transformer to a second diode bridge;
   wherein a fourth electrical pathway connects the center tap of the fourth transformer to the second diode bridge;
   wherein closing the first aggregation relay includes shorting the first and third electrical pathways together; and
   wherein closing the second aggregation relay includes shorting the second and fourth electrical pathways together.

15. A method as in claim 14, further comprising:
   electrically disconnecting the second diode bridge from the center tap of the third transformer when shorting the first and third electrical pathways together; and
   electrically disconnecting the second diode bridge from the center tap of the fourth transformer when shorting the second and fourth electrical pathways together.

16. A method as in claim 14, further comprising:
   prior to closing the first and second aggregation relays, (i) sensing through a third diode bridge connected across the first and third electrical pathways to determine whether a voltage difference exists between the first and third electrical pathways, the third diode bridge being separate and distinct from the first and second diode bridges, and (ii) disabling control circuitry connected to the relays when the predefined voltage difference exists between the first and third electrical pathways.

17. A method as in claim 13 wherein closing the first aggregation relay includes actuating the first aggregation relay in response to a control signal; and
   wherein closing the second aggregation relay includes actuating the second aggregation relay in response to the control signal to actuate the second aggregation relay contemporaneously with actuation of the first aggregation relay.

18. A method as in claim 17, further comprising:
   generating the control signal after power sourcing equipment operates to deliver inline power through the center taps of the first and second transformers and concurrently through the center taps of the third and fourth transformers.

19. A method as in claim 17, further comprising:
   generating the control signal before power sourcing equipment operates to deliver inline power through the center taps of the first and second transformers and concurrently through the center taps of the third and fourth transformers.

20. A method as in claim 13, further comprising:
   when power sourcing equipment has power turned off to the center taps of the first and second transformers and to the center taps of the third and fourth transformers, presenting a first classification signature to the power sourcing equipment through the center taps of the first and second transformers, and the first classification signature to the power sourcing equipment through the center taps of the third and fourth transformers; and
   when the power sourcing equipment subsequently has power turned on to the center taps of the first and second transformers, presenting a second classification signature to the power sourcing equipment through the center taps of the third and fourth transformers, the second classification signature being different than the first classification signature.

* * * * *